US006049814A

United States Patent [19]

Serizawa

[11] Patent Number: 6,049,814

[45] Date of Patent: Apr. 11, 2000

[54] SPECTRUM FEATURE PARAMETER EXTRACTING SYSTEM BASED ON FREQUENCY WEIGHT ESTIMATION FUNCTION

[75] Inventor: Masahiro Serizawa, Tokyo, Japan

[73] Assignee: NEC Corporation, Tokyo, Japan

[21] Appl. No.: 08/999,396

[22] Filed: Dec. 29, 1997

[30] Foreign Application Priority Data

Dec. 27, 1996 [JP] Japan .................................... 8-358285

[51] Int. Cl.[7] ...................................................... G06F 17/15

[52] U.S. Cl. ............................................ 708/422; 704/216

[58] Field of Search .................................... 708/422, 426; 704/216–218

[56] References Cited

U.S. PATENT DOCUMENTS 4,962,536 10/1990 Satoh ...................................... 704/218

FOREIGN PATENT DOCUMENTS

| | | |
|---|---|---|
| 63-223700 | 9/1988 | Japan . |
| 2-160300 | 6/1990 | Japan . |
| 3-15900 | 1/1991 | Japan . |
| 3-116199 | 5/1991 | Japan . |
| 7-20898 | 1/1995 | Japan . |
| 7-160298 | 6/1995 | Japan . |

OTHER PUBLICATIONS

Labiner et al., "Digital Processing of Speed Signal: Section 8.1", pp. 398–404.

Deller et al., "Discrete–Time Processing of Speech Signals", pp. 290–331, (1993).

Tokura et al., "Quality Improvement in Low–Order Bit Pacor", pp. 1–8, (1977).

Chu et al.: "Frequency weighted linear prediction" proceedings of ICASSP 82. IEEE, 1982, May 3–5, 1982, pp. 1318–1321, vol. 2, XP002088519, 1982.

C. H. Lee: "On robust linear prediction of 1–7 speech" IEEE, May 1988, USA, vol. 36, No. 5, pp. 642–650, XP002088520, ISSN 0096–3518, pp 643, col. 2, lines 9–33.

*Primary Examiner*—Tan V. Mai

*Attorney, Agent, or Firm*—Foley & Lardner

[57] ABSTRACT

A system solves a problem of a low accuracy in a low-energy frequency area when spectrum feature parameters are extracted with the use of linear analysis of speech or audio signals and a problem of a low accuracy in formant extracting when a spectrum approximation is slanted, and increases the extracting accuracy of spectrum feature parameters with respect to any given frequency band. This system includes an input unit for receiving an input signal, a weight calculating unit for receiving a weight function impulse response, a storing unit for storing the input signal for a specified length of time, a filtering unit for filtering the input signal using the impulse response, an auto-correlation calculating unit for calculating autocorrelation of the filtered input signal, a cross-correlation calculating unit for calculating cross-correlation between the filtered input signal and the impulse response, and a spectrum feature parameter calculating unit for calculating spectrum feature parameters of the input signal using the autocorrelation and the cross-correlation.

8 Claims, 5 Drawing Sheets

SPECTRUM FEATURE PARAMETER EXTRACTING SYSTEM BASED ON FREQUENCY WEIGHT ESTIMATION FUNCTION

FIELD OF THE INVENTION

The present invention relates to a spectrum feature parameter sampling system, and more particularly to a spectrum feature parameter extracting system suitable for sampling spectrum feature parameters from speech or audio signals.

BACKGROUND OF THE INVENTION

Various systems have been devised heretofore to sample spectrum feature parameters through linear predictive analysis. One known system uses a covariance method. The covariance method is described, for example, in document (1) ("DIGITAL PROCESSING OF SPEED SIGNAL", L. R. LABINER/R. W.SCHAFER, Section 8.1, pp. 398–404). Such a conventional system extracts spectrum feature parameters to minimize the value of the estimation function in (1).

$$E=\oint_{|z|=1}|A(z)Y(z)|^2(dz/2\pi j) \quad (1)$$

In the above formula, Y(z) is the z-frequency area representation of the input signal y(to). 1/A(z) is a transfer unction representing the spectral function of an input signal. (z) is represented by the following formula (1-1):

$$A(z)=1+\sum_{i=1}^{p}a(i)z^{-i} \quad (1\text{-}1)$$

a (i) is a spectrum feature parameter. In this transfer function, one energy concentration (formant) found in a frequency spectrum is represented by two parameters. p is an analysis order. Transforming the formula (1) into a time area results in the estimation function $E_t$ shown in (2).

$$E_t=\sum_{t=0}^{N-1}\left(y(t)-\vec{h}^T(t)\vec{a}\right)^2 \quad (2)$$

where $$\vec{h}^T(t)=[y(t-1)\ldots y(t-p)] \quad (3)$$

$$\vec{a}^T=[a(1)\ldots a(p)] \quad (4)$$

N is the number of input signal samples.

The spectrum feature parameter vector a which minimizes the above formula (2) is obtained by solving the following normal equation (5).

$$\vec{R}\vec{a}=\vec{b} \quad (5)$$

where $$\vec{R}=\begin{pmatrix} r(1,1) & \cdots & r(1,p) \\ r(1,2) & r(2,2) & \vdots \\ \vdots & & \vdots \\ r(1,p) & \cdots & r(p,p) \end{pmatrix} \quad (6)$$

$$\vec{b}^T=[r(0,1)r(0,2)\ldots r(0,p)] \quad (7)$$

-continued $$r(i,j)=\sum_{t=0}^{N-1}y(t-i)y(t-j),\ i<j,\ i=0,\ \ldots,\ p,\ j=1,\ \ldots,\ p \quad (8)$$

FIG. 5 is a block diagram showing the configuration of a conventional spectrum feature parameter extracting system. The operation of the conventional system is described with reference to FIG. 5.

First, a buffer circuit 2 stores an input signal y(t) sent from an input terminal 1 for a specified length of time N.

A correlation calculation circuit 4 calculates the autocorrelation of the input signal stored in the buffer circuit 2 according to the equation (8) and outputs an autocorrelation matrix R (equation (6)) and the autocorrelation vector b in the formula (7) above. (The vector symbols → above the vectors a, b etc. and the matrix R are omitted.)

A parameter calculation circuit 6 solves the normal equation (5) shown above using the autocorrelation matrix R and the autocorrelation vector b, calculates the spectrum feature parameter vector a, and outputs the result from an output terminal 7.

The Cholesky decomposition algorithm is used to solve the above normal equation (5). For more information on the Cholesky decomposition, refer to document (2) (Discrete-Time Processing of Speech Signals, J. R. Deller et al., Macmillan Pub 1993).

SUMMARY OF THE DISCLOSURE

The conventional system uses an estimation function which estimates all the frequency area evenly as in the above formula (1). Therefore, it is difficult to increase the accuracy of spectrum feature parameter extracting in a given frequency area.

The present invention seeks to solve the problems associated with a prior art described above. In view of the foregoing, it is an object of the present invention to provide a spectrum feature parameter sampling system which solves the problem of a low sampling accuracy in a low-energy frequency area or accuracy loss in sampling energy formants if the spectrum approximation is slanted (not even or deviated), when spectrum feature parameters are extracted from speech or audio signals using linear predictive analysis.

Particularly, it is an object of the present invention to provide spectrum feature parameter extracting apparatus having an improved extracting accuracy over any desired frequency band.

To achieve the above object, a spectrum feature parameter extracting system according to a first aspect of the invention comprises: signal input means for receiving an input signal; means for entering impulse response of a weight function; storing means for storing the input signal for a specified length of time; filtering means for filtering the input signal using the impulse response; (first) calculating means for calculating autocorrelation of the filtered input signal; (second) calculating means for calculating cross-correlation between the filtered input signal and the impulse response; (third) calculating means for calculating spectrum feature parameters of the input signal using the autocorrelation and the cross-correlation; and output means for outputting the spectrum feature parameters.

According to a second aspect, there is provided a spectrum feature parameter extracting system which comprises: a signal input means for receiving an input signal; means for entering a weight function; storing means for storing the input signal for a specified length of time; (fourth) calculating means for calculating an impulse response from said weight function; means for filtering the input signal using the weight function; (first) calculating means for calculating autocorrelation of the filtered input signal; (second) calculating means for calculating cross-correlation between the filtered input signal and the impulse response; (third) calculating means for calculating spectrum feature parameters of the input signal using the autocorrelation and the cross-correlation; and output means for outputting said spectrum feature parameters.

According to a third aspect, there is provided a spectrum feature parameter extracting system which comprises: means for receiving an input signal; means for storing the input signal for a specified length of time; means for calculating an impulse response of a weight function using the input signal; means for filtering the input signal using the impulse response; means for calculating autocorrelation of the filtered input signal; means for calculating cross-correlation between the filtered input signal and said impulse response; means for calculating spectrum feature parameters of the input signal using the autocorrelation and the cross-correlation; and means for outputting the spectrum feature parameters.

According to a fourth aspect, there is provided a spectrum feature parameter extracting system which comprises: means for receiving an input signal; means for storing said input signal for a specified length of time; means for calculating a weight function using the input signal; means for calculating an impulse response from the weight function; means for filtering the input signal using the weight function; means for calculating autocorrelation of the filtered input signal; means for calculating cross-correlation between the filtered input signal and the impulse response; means for calculating spectrum feature parameters of the input signal using the autocorrelation and the cross-correlation; and means for outputting the spectrum feature parameters.

The spectrum feature parameter extracting system according to the present invention, with the configuration described above, samples spectrum feature parameters from input signals so that the value of an estimation function is minimized according to the frequency weight. Thus, a large weight given on any given frequency area allows sampling error to be estimated more noticeably in that area. This makes it possible to increase the extracting accuracy of spectrum feature parameters in the frequency band.

PREFERRED EMBODIMENTS

There is shown a preferred embodiment of the present invention. In a preferred form, the embodiment according to the present invention extracts linear predictive coefficients a(i), which are spectrum feature parameters so that the value of an estimation function containing a frequency weight function W(z), shown in the formula (9) below, is minimized.

$$E_W = \oint_{|z|=1} |W(z)(\overline{A}(z)Y(z) - 1)|^2 (dz/2\pi j) \tag{9}$$

$$\overline{A}(z) = \sum_{i=0}^{p} \overline{a}_W(i) z^{-i} \tag{10}$$

$$W(z) = 1 \Big/ \left(1 + \sum_{i=0}^{s} d_W(i) z^{-i}\right) \tag{11}$$

where, $d_w$, (i) and s are the coefficient of each weight function and its order, respectively.

The spectrum feature parameters $a_w(i)$, i=1, . . . , p, are obtained by normalizing $\overline{a}_w(i)$, i=0, . . . , p, with the zero order term $\overline{a}_w(0)$, using the formula (12) given below.

$$a_W(i) = \overline{a}_W(i)/\overline{a}_W(0),\ i=1, \ldots, p \tag{2}$$

Transforming the above formula (9) into a time area representation produces the following formula (13):

$$E_t = \sum_{t=0}^{N-1} \left(\vec{h}_W^T(t)\vec{\overline{a}}_W - w(t)\right)^2 \tag{13}$$

where $$\vec{h}_W^T(t) = [y_W(t) y_W(t-1) \ldots y_W(t-p)] \tag{14}$$

$$y_W(t) = \sum_{i=0}^{L-1} w(i) y(t-i) \tag{15}$$

$$\{w(i)\} = \{1, w(1), w(2), \ldots, w(L-1)\} \tag{16}$$

$$\vec{\overline{a}}_W^T = [\overline{a}_W(0) \overline{a}_W(1) \ldots \overline{a}_W(p)] \tag{17}$$

w(i) is an impulse response of the weight function W(z), and L is the impulse response length.

The vector $\overline{a}_w(i)$, which minimizes the formula (13) shown above, is obtained by setting the partial differential vector with respect to $\overline{a}_w(i)$ to zero. As a result, the following normal equation is obtained:

$$\vec{R}_W \vec{\overline{a}}_W = \vec{c}_W \tag{18}$$

where $$\vec{R}_W = \begin{pmatrix} r_W(0,0) & \cdots & r_W(0,p) \\ r_W(0,1) & r(1,1) & \vdots \\ \vdots & & \vdots \\ r_W(0,p) & \cdots & r_W(p,p) \end{pmatrix} \tag{19}$$

$$r_W(i,j) = \sum_{t=0}^{N-1} y_W(t-i) y_W(t-j),\ i, j = 0, \ldots, p \tag{20}$$

$$\vec{c}_W^T = [c_W(0) \ldots c_W(p)] \tag{21}$$

$$c_W(i) = \sum_{t=0}^{N-1} y_W(t-i) w(i),\ i = 0, \ldots, s \tag{22}$$

The following explains, in detail, a plurality of embodiments according to the present invention with reference to the drawings.

First Embodiment

Figure 1:
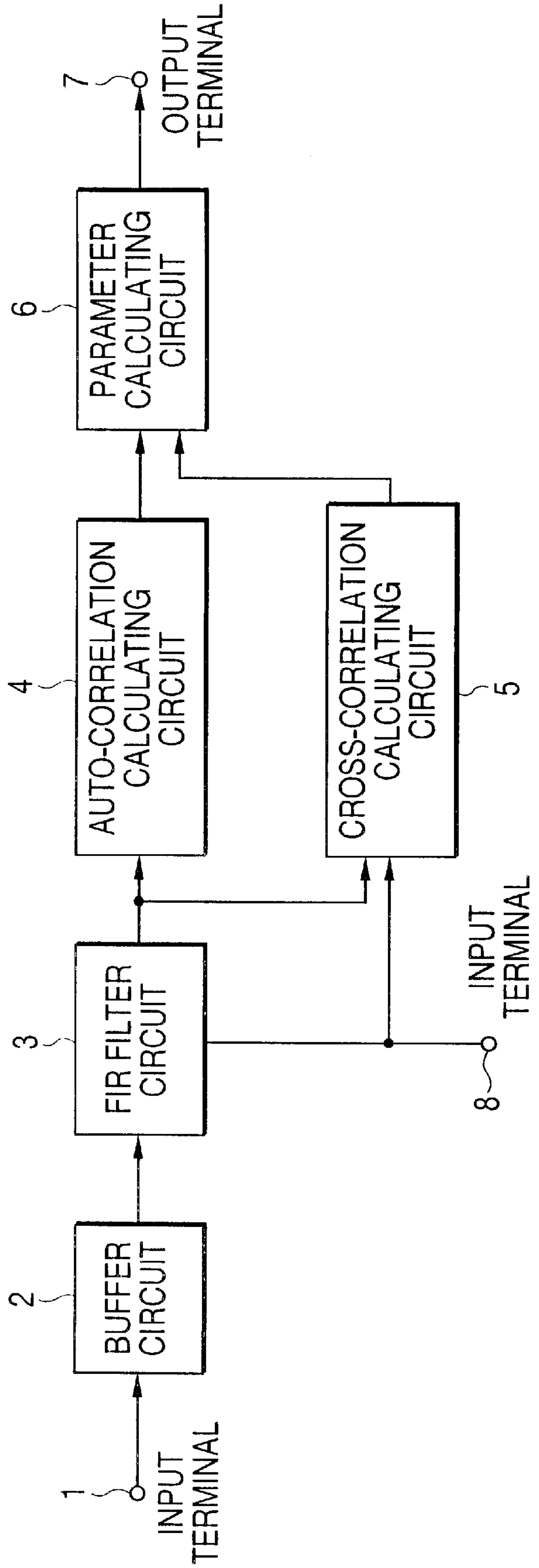
FIG. 1 is a block diagram showing the configuration of a first embodiment according to the present invention.

FIG. 1 is a block diagram showing the configuration of the first embodiment according to the present invention.

In FIG. 1, an input signal y(t) and a weight function impulse response w(i) are input via an input terminal 1 and an input terminal 8, respectively. A buffer circuit 2 stores the input signal(y) for a length of time N.

Then, a Finite Impulse Response (FIR) filter circuit 3 uses the weight function impulse response w(i) entered from the input terminal 8 based on the above formula (15), and produces a weighted input signal $y_w(t)$.

An autocorrelation calculation circuit 4 calculates an autocorrelation matrix $R_w$ based on the above formulas (19) and (20).

A cross-correlation calculation circuit 5 calculates a cross-correlation vector $C_w$ for the weighted input signal $y_w(t)$ and the impulse response w(i) based on the above formulas (21) and (22).

A parameter calculation circuit 6 solves the normal equation shown in formula (18) using the autocorrelation matrix $R_w$ and the cross-correlation vector $C_w$, and produces the vector $\bar{a}_w$. In addition, the circuit calculates the spectrum feature parameter vector $a_w$ from $\bar{a}_w$ using the above formula (12).

Here, in solving the normal equation shown in formula (18), the Cholesky decomposition algorithm is used as in the conventional method.

Second Embodiment

Figure 2:
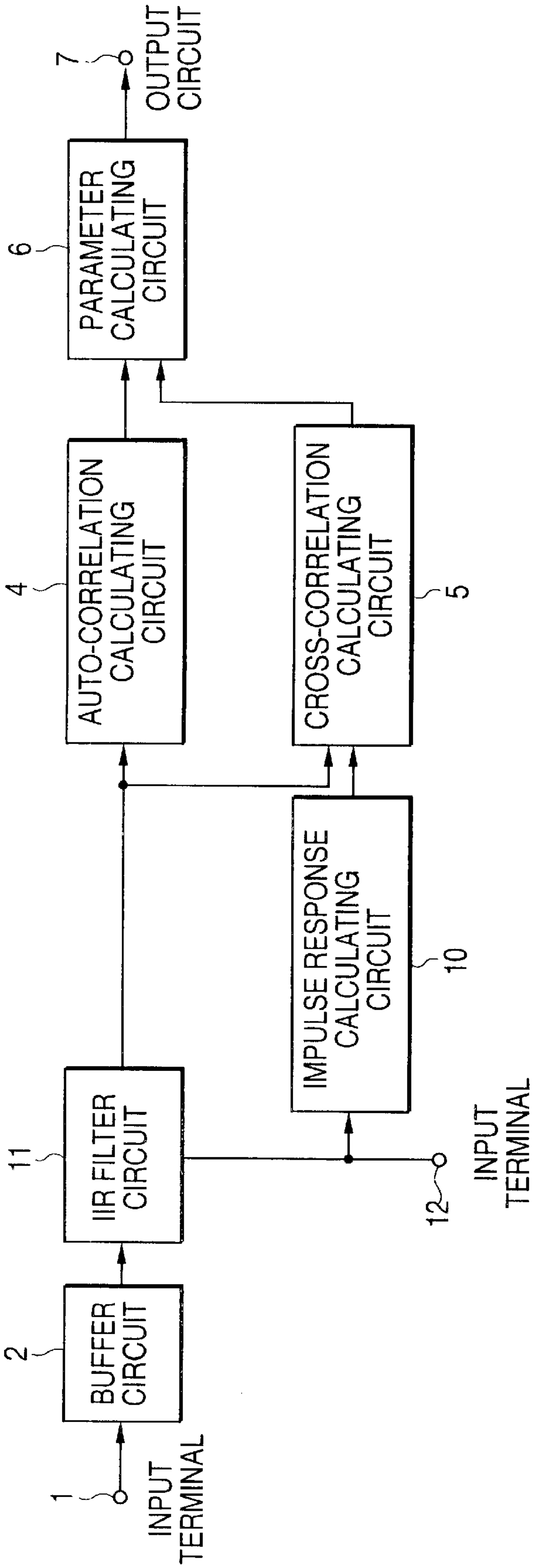
FIG. 2 is a block diagram showing the configuration of a second embodiment according to the present invention.

FIG. 2 is a block diagram showing the configuration of an embodiment according to the second aspect. As shown in FIG. 2, the second embodiment differs from the first embodiment in that input signal filtering is done using a transfer function W(z) shown in formula (11) instead of an impulse response used in the first embodiment.

In FIG. 2, the input terminal 8 from which an impulse response is entered in the first embodiment has been changed to an input terminal 12 from which a coefficient of the transfer function W(z) is entered. The FIR filter circuit has been changed to an Infinite Impulse Response (IIR) filter circuit, and an impulse response calculation circuit 10 has been added between the input terminal 12 and the cross-correlation calculating circuit 5. The following explains the operation of the IIR filter circuit 11 and the impulse response calculation circuit 10.

The IIR filter circuit 11 filters stored input signals y(t) using the formula (23) shown below which is comprises the coefficient $d_w(i)$ of the transfer function W(z) entered from the input terminal 12, and produces a weighted input signal $y_w(t)$.

$$y_W(t) = -\sum_{i=0}^{L} d_W(i) y_W(t-i) + y(t) \tag{23}$$

The impulse response calculation circuit 10 calculates the impulse response of the weight function W(z) passed from the input terminal 12, and outputs the result.

Third Embodiment

Figure 3:
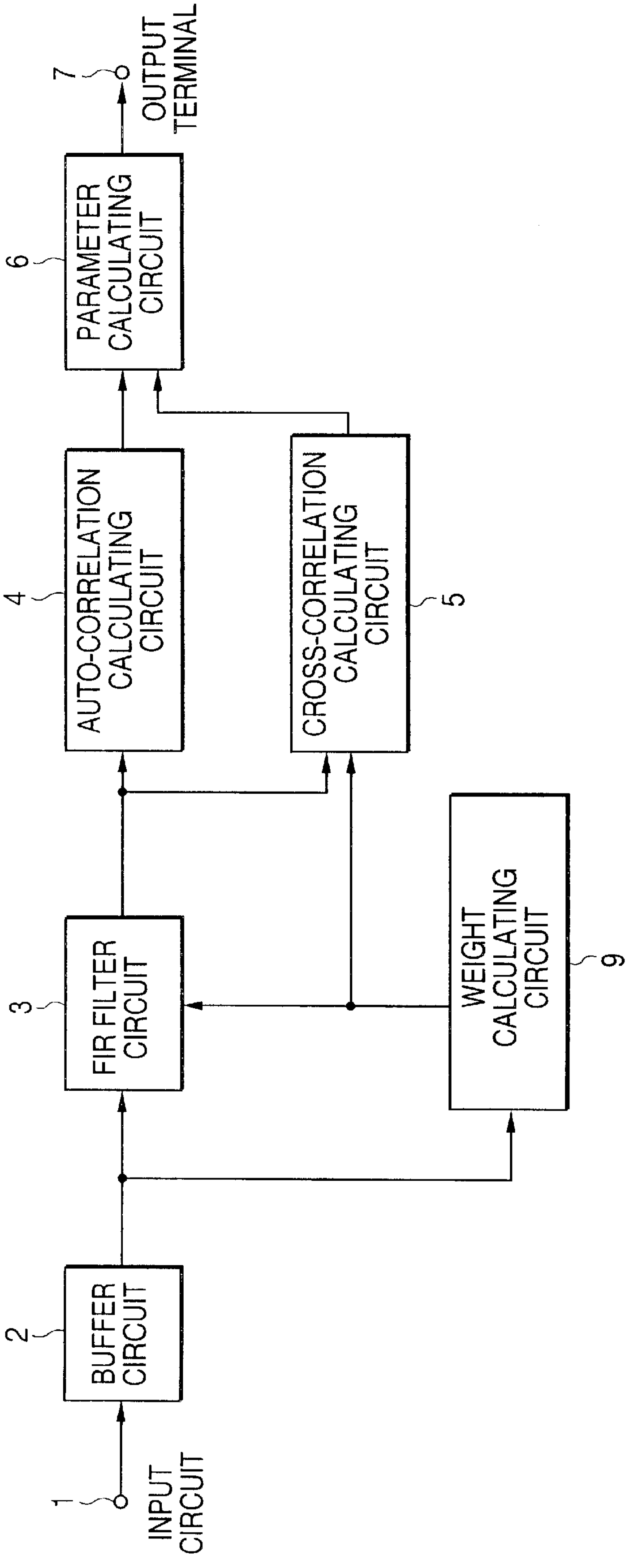
FIG. 3 is a block diagram showing the configuration of a third embodiment according to the present invention.

FIG. 3 is a block diagram showing the configuration of an embodiment according to the third aspect. As shown in FIG. 3, the third embodiment differs from the first embodiment in that a weight calculation circuit 9 (which receives the input signal from the buffer circuit 2) is added to calculate the impulse response of the weight function from input signals. As this impulse response, the impulse response of the transfer function, composed of the parameters calculated from the input signals using the conventional spectrum feature parameter extracting system, is used.

Figure 4:
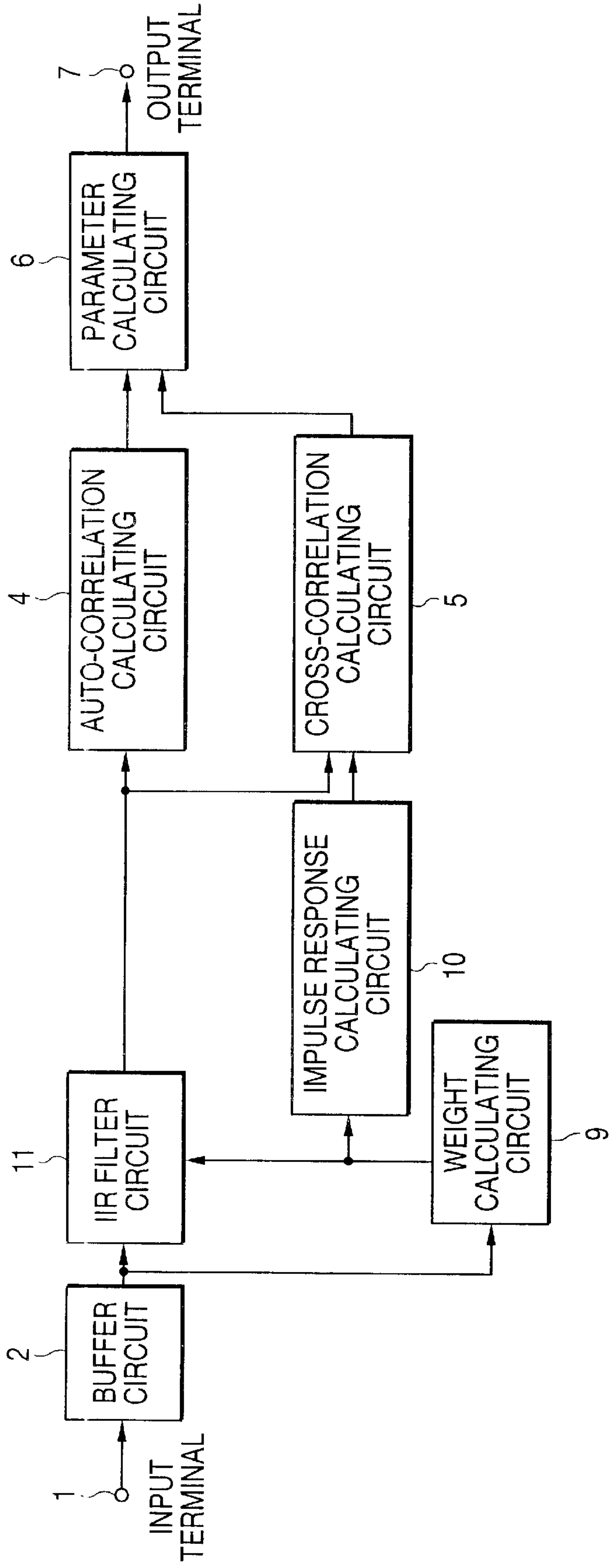
FIG. 4 is a block diagram showing the configuration of a fourth embodiment according to the present invention.
Figure 5:
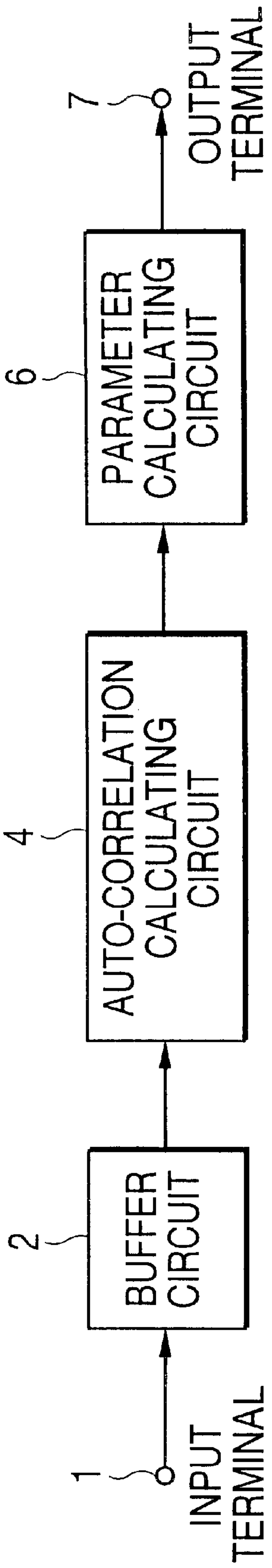
FIG. 5 (PRIOR ART)
FIG. 5 is a block diagram showing an example of the configuration of a conventional spectrum feature parameter sampling system.

FIG. 4 is a block diagram showing the configuration of an embodiment according to the fourth aspect. As shown in FIG. 4, the fourth embodiment differs from the second embodiment in that a weight calculation circuit 9 (which receives the input signal from the buffer circuit 2 and delivers an output to the IIR filter circuit and the impulse response calculating circuit 10) is added to calculate the weight function from input signals. As this impulse response, the impulse response of the transfer function, composed of the parameters calculated from the input signals using the conventional spectrum feature parameter extracting system, is used.

The systems shown in the third and fourth embodiments directly use the transfer function composed of the spectrum feature parameters calculated by the conventional system. However, formant band expansion may be done on the transfer function before it is used in the above calculation.

This processing enables a formant weight to be adjusted. For details of formant band expansion, see the document (3) ("Quality Improvement in Low-Order Bit PACOR", Tokura and Itakura, S77-07, Speech study group, Japan Acoustics Institute, 1977).

As described above, the present invention introduces a frequency weight function into a spectrum feature parameter sampling estimation function, improving the sampling accuracy of spectrum feature parameters with respect to any given frequency band.

It should be noted that any modification obvious in the art can be done without departing the gist of the invention as disclosed herein within the scope of the present invention as defined by the appended claims.

What is claimed is:

1. A spectrum feature parameter extracting system comprising:

(a) means for receiving an input signal;

(b) means for entering impulse response of a weight function;

(c) means for storing said input signal for a specified length of time;

(d) means for filtering said input signal using said impulse response;

(e) means for calculating autocorrelation of said filtered input signal;

(f) means for calculating cross-correlation between said filtered input signal and said impulse response;

(g) means for calculating spectrum feature parameters of said input signal using said autocorrelation and said cross-correlation; and (h) means for outputting said spectrum feature parameters.

2. A spectrum feature parameter extracting system comprising:

(a) means for receiving an input signal;

(b) means for entering a weight function;

(c) means for storing said input signal for a specified length of time;

(d) means for calculating an impulse response from said weight function;

(e) means for filtering said input signal using said weight function;

(f) means for calculating autocorrelation of said filtered input signal;

(g) means for calculating cross-correlation between said filtered input signal and said impulse response;

(h) means for calculating spectrum feature parameters of said input signal using said autocorrelation and said cross-correlation; and (i) means for outputting said spectrum feature parameters.

3. A spectrum feature parameter extracting system comprising:

(a) means for receiving an input signal;

(b) means for storing said input signal for a specified length of time;

(c) means for calculating an impulse response of a weight function using said input signal;

(d) means for filtering said input signal using said impulse response;

(e) means for calculating autocorrelation of said filtered input signal;

(f) means for calculating cross-correlation between said filtered input signal and said impulse response;

(g) means for calculating spectrum feature parameters of said input signal using said autocorrelation and said cross-correlation; and (h) means for outputting said spectrum feature parameters.

4. A spectrum feature parameter extracting system comprising:

(a) means for receiving an input signal;

(b) means for storing said input signal for a specified length of time;

(c) means for calculating a weight function using said input signal;

(d) means for calculating an impulse response from said weight function;

(e) means for filtering said input signal using said weight function;

(f) means for calculating autocorrelation of said filtered input signal;

(g) means for calculating cross-correlation between said filtered input signal and said impulse response;

(h) means for calculating spectrum feature parameters of said input signal using said autocorrelation and said cross-correlation; and (i) means for outputting said spectrum feature parameters.

5. A spectrum feature parameter extracting system comprising:

(a) means for storing an input signal y(t) for a specified length of time (=N) (that is, t=0, . . . , N−1);

(b) means for generating a weighted input signal $y_w(t)$ by filtering said stored input signal y(t) using an impulse response (w(i), i=0, . . . , L−1) in time area of frequency weight function W(z);

(c) means for calculating an autocorrelation matrix $R_w$ of said weighted input signal $y_w(t)$;

(d) means for calculating a cross-correlation vector $c_w$ between said weighted input signal $y_w(t)$ and an impulse response w(i) of said frequency weight function;

(e) means for deriving a vector $\bar{a}_w$ by solving a normal equation $R_w\bar{a}_w=c_w$ using said autocorrelation matrix $R_w$ and said cross-correlation vector $c_w$ and for normalizing the resulting vector to produce spectrum feature parameter vector $a_w$.

6. A spectrum feature parameter extracting system comprising:

(a) means for storing an input signal y(t) for a specified length of time (=N) (that is, t=0, . . . , N−1);

(b) means for calculating an impulse response w(i) from a frequency weight function W(z);

(c) means for generating a weighted input signal $y_w(t)$ by filtering said input signal y(t) using said frequency weight W(z);

(d) means for calculating an autocorrelation matrix $R_w$ of said weighted input signal $y_w(t)$;

(e) means for calculating a cross-correlation vector $c_w$ between said weighted input signal $y_w(t)$ and an impulse response w(i) of said frequency weight function;

(f) means for deriving a vector $\bar{a}_w$ by solving a normal equation $R_w\bar{a}_w=c_w$ using said autocorrelation matrix $R_w$ and said cross-correlation vector $c_w$ and for normalizing the vector to produce spectrum feature parameter vector $a_w$.

7. A spectrum feature parameter sampling system as defined by claim 5, further comprising means for calculating and outputting an impulse response w(i) of said frequency weight function W(z) in a time area.

8. A spectrum feature parameter sampling system as defined by claim 6, further comprising means for calculating and outputting an impulse response w(i) of said frequency weight function W(z) in a time area.

* * * * *